US011620610B2

(12) United States Patent
Canseco et al.

(10) Patent No.: US 11,620,610 B2
(45) Date of Patent: Apr. 4, 2023

(54) MACHINE LEARNING TO PREDICT IMPENDING ABANDONMENT OF BOPIS ORDERS

(71) Applicant: International Business Machines Corporation, Armonk, NY (US)

(72) Inventors: Borja Canseco, Austin, TX (US); John Kaufmann, Austin, TX (US); Lisa Seacat DeLuca, Baltimore, MD (US); Andrea Young, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 138 days.

(21) Appl. No.: 16/585,455

(22) Filed: Sep. 27, 2019

(65) Prior Publication Data

US 2021/0097483 A1  Apr. 1, 2021

(51) Int. Cl.

| | |
|---|---|
| G06Q 10/08 | (2012.01) |
| G06Q 30/06 | (2012.01) |
| G06Q 10/0836 | (2023.01) |
| G06Q 10/083 | (2023.01) |
| G06Q 10/0835 | (2023.01) |
| G06Q 30/0601 | (2023.01) |

(52) U.S. Cl.
CPC ..... *G06Q 10/0836* (2013.01); *G06Q 10/0838* (2013.01); *G06Q 10/08355* (2013.01); *G06Q 30/0635* (2013.01)

(58) Field of Classification Search
CPC ........ G06Q 10/0836; G06Q 10/08355; G06Q 10/0838; G06Q 30/0635
See application file for complete search history.

(56) References Cited

U.S. PATENT DOCUMENTS

| | | |
|---|---|---|
| 10,210,555 B2 | 2/2019 | Li et al. |
| 2003/0046173 A1 | 3/2003 | Benjier et al. |

(Continued)

OTHER PUBLICATIONS

Ewing, M., "How to Save Ecommerce Sales With Abandoned Cart Emails," Nov. 18, 2011, Hub Spot, retrieved from https://blog.hubspot.com/blog/tabid/6307/bid/28476/how-to-save-ecommerce-sales-with-abandoned-cart-emails.aspx (Year: 2011).*

(Continued)

*Primary Examiner* — Rupangini Singh
*Assistant Examiner* — Bryan J Kirk
(74) *Attorney, Agent, or Firm* — Michael A. Petrocelli

(57) ABSTRACT

A buy-online pickup-in-store (BOPIS) order at risk of abandonment is saved by converting the order to same-day delivery. A risk deadline is established using a combination of cognitive prediction, a customer-specific time frame, order constraints, and real-time data. The cognitive prediction uses a customer profile having historical data pertaining to previous BOPIS orders from this customer. If the product is not picked up by the risk deadline, a check is made to see if same-day delivery is feasible. If so, a notification is transmitted to the customer with proposed delivery details. The notification can be sent at an optimal time based on previous notifications sent to the customer and time constraints related to the order, and using an optimal communication channel based on previous engagement rates with the customer over different communication channels. Once confirmation is received from the customer, the product is shipped, saving the sale.

18 Claims, 7 Drawing Sheets

(56) References Cited

U.S. PATENT DOCUMENTS

| | | | |
|---|---|---|---|
| 2004/0176998 A1* | 9/2004 | Kirshenbaum | G06Q 30/0207 705/14.71 |
| 2007/0192200 A1* | 8/2007 | Weng | G06Q 30/0609 705/26.35 |
| 2008/0162304 A1 | 7/2008 | Ourega | |
| 2009/0228325 A1 | 9/2009 | Simmons | |
| 2012/0323682 A1* | 12/2012 | Shanbhag | G06Q 30/0641 705/14.66 |
| 2013/0006739 A1* | 1/2013 | Horvitz | G06Q 30/06 705/14.23 |
| 2013/0346237 A1* | 12/2013 | Rademaker | G06Q 10/0836 705/26.8 |
| 2014/0279238 A1 | 9/2014 | Jones et al. | |
| 2015/0170086 A1 | 6/2015 | Byron | |
| 2015/0193859 A1 | 7/2015 | Colello et al. | |
| 2015/0310536 A1 | 10/2015 | Brady et al. | |
| 2016/0027261 A1* | 1/2016 | Motoyama | G08B 5/36 340/313 |
| 2017/0228811 A1* | 8/2017 | Moreau | G06Q 30/0224 |
| 2017/0330123 A1* | 11/2017 | Deshpande | G06Q 30/0206 |
| 2017/0337523 A1* | 11/2017 | Roach | G06Q 10/1097 |
| 2018/0137433 A1* | 5/2018 | Devarakonda | G06N 5/022 |
| 2018/0232755 A1 | 8/2018 | Li et al. | |
| 2018/0349953 A1 | 12/2018 | Tian et al. | |
| 2019/0188630 A1* | 6/2019 | Wu | G06N 5/003 |
| 2020/0084280 A1* | 3/2020 | Malhotra | G06N 20/00 |
| 2020/0175472 A1* | 6/2020 | Kaiser | G06Q 10/0834 |
| 2021/0082074 A1* | 3/2021 | Lye | G06Q 30/06 |
| 2021/0097590 A1 | 4/2021 | Canseco | |

OTHER PUBLICATIONS

IBM, "Method and Apparatus for Online Shopping with In Store Pickup and Payment", ip.com, IP.com No. IPCOM000010644D (2003).

Witcher, Brendan, "Abolish Abandon Rates For In-Store Pickup", Forrester Research, Inc., Cambridge, Massachusetts (2016).

List of IBM Patents or Patent Applications Treated as Related. Filed Herewith. 2 pages.

* cited by examiner

150

Reminder: Joe's Club Pickup Order #190762 is awaiting pickup

From: Joe's Club <transaction@joesclub.com>                                August 8, 2019
To: Jen Smith <jqsmith@xyz.com>

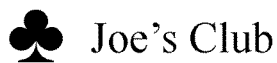 Joe's Club

Grocery        Electronics        Furniture        Outdoor        Home

If you don't pickup soon you may lose out on this great deal!
This order was made available for pickup on August 6 at 6:00 pm Hi Jen Smith,
Your cart is loaded and waiting for you in the Joe's Club at 1034 Westover. You've paid online for this order. If there is an adjustment to the final total, we'll make it when you pick up your items.

What's Next?

Bring your:                              Check in at:
- Photo ID (government issued)           the Joe's Club
- Order #190762                          Pickup kiosk

Get your order delivered TODAY!

Don't have time to get to the store? Don't risk your order being cancelled. For only $7, we can have a courier deliver it to your home.                              ─152

[Cancel Order]    [Extend Store Pickup]    [Get it Delivered]

*FIG. 8*

MACHINE LEARNING TO PREDICT IMPENDING ABANDONMENT OF BOPIS ORDERS

CROSS-REFERENCE TO RELATED APPLICATION

This application is related to U.S. patent application Ser. No. 16/585,423 entitled "TURNING PREDICTED ABANDONED BOPIS ORDERS INTO SAME-DAY DELIVERY" (attorney docket no. P201901630US01) filed concurrently herewith, which is hereby incorporated.

BACKGROUND OF THE INVENTION

Field of the Invention

The present invention generally relates to online commerce, and more particularly to a method of handling a buy-online pickup-in-store order.

Description of the Related Art

The Internet has introduced many changes for consumer spending, chief among these being online shopping, sometimes referred to as eCommerce. There are two common scenarios for online shopping. In one scenario, items purchased online are shipped from stores directly to the purchaser's home or place of business; in another scenario, items purchased online are picked up in stores by online shoppers. Many retailers have added buy-online pickup-in-store (BOPIS) capability in their stores (sometimes referred to as "click and collect"). Retailers can offer BOPIS service to their customers and can get additional benefits such as inventory optimization and fewer returns, while avoiding delivery charges.

For buying online and picking up in store, a seller commits to an online shopper that an item purchased online is ready to be picked up in a specific store and at a specific time. A customer can place an order through any channel and later arrive at a store to pick up products. A store associate can keep the products ready at a kiosk at the front of the store to enable a pickup recipient or gift recipient to pick up the products on arrival at the store. When the shopper arrives at the store to collect the products in an order, the associate can identify the person at the store front and the shopper can provide verification details. Alternatively, the product may be placed in a secure locker with a code given to the customer that allows access to the locker without requiring assistance of the store associate. Once the product has been picked up, the associate can make a corresponding entry in the store's order system indicating that the product has actually been picked up, i.e., the sale has been completed.

SUMMARY OF THE INVENTION

The present invention in at least one embodiment is generally directed to a method of assessing a likelihood of abandonment of a current buy-online pickup-in-store (BOPIS) order for a product of a store by a customer by training a cognitive system with historical information on previous BOPIS orders from multiple customers wherein the historical information includes BOPIS data for a given one of the previous BOPIS orders respectively correlated with a historical outcome relative to a pick-up or abandonment of the given order, receiving a current customer profile uniquely associated with the customer having historical data pertaining to multiple previous BOPIS orders from the customer, and using the cognitive system to predict an abandonment delay for the current BOPIS order based on the current customer profile wherein the abandonment delay represents a period of time after which the BOPIS order is likely to become abandoned. The current customer profile can further include demographic data associated with the customer which is used by the cognitive system in predicting the abandonment delay. In one implementation the cognitive system generates a confidence value indicating whether the BOPIS order will be abandoned by a given point in time, and abandonment of the BOPIS order is deemed likely when the confidence value exceeds a predetermined threshold. A risk deadline for the current BOPIS order can then be computed based on the abandonment delay relative to an order time associated with the current BOPIS order. The computation of the risk deadline can further be based on a customer-specific time frame, one or more order constraints, and real-time data. When the store monitoring the pickup status of the current BOPIS order determines that the product has not been picked up by the risk deadline, it can determine the feasibility for delivering the product for a known delivery charge, and transmit a notification to the customer that the product can be delivered with proposed delivery details including the delivery charge. Once a confirmation for delivery is received from the customer, the product can be shipped.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

FIG. 8 is a sample notification that is sent to a customer whose BOPIS order has been selected for same-day shipping in accordance with one implementation of the present invention.

The use of the same reference symbols in different drawings indicates similar or identical items.

DESCRIPTION OF THE PREFERRED EMBODIMENT(S)

BOPIS ordering has greatly enhanced online shopping capabilities for stores as well as offering more flexibility to customers, but there is still a problem when a BOPIS order is not picked up by the customer. Some studies estimate that as many as 30% of customers have abandoned a BOPIS order within three months of being surveyed. This number can rise to 48% for some classes of customers such as millennial shoppers.

This outcome is a huge problem for retailers, one that is costing them a lot of money. When a product is not picked up, the customer receives a refund and a sale is lost. It would, therefore, be desirable to devise an improved method of BOPIS ordering that could detect possible abandonment of an order to allow remedial action. It would be further advantageous if the method could convert the BOPIS order to a delivery order to immediately save the sale. These and other advantages are achieved in various embodiments of the present invention using a system and method to save the sale for retailers when a BOPIS order is not picked up in a reasonable period of time. The system can trigger the retrieval of cost estimates for same-day delivery to convert the BOPIS order into same-day fulfillment. The solution preferably includes creation of a user profile that uses real-time data (site activity patterns, store traffic, etc.) along with historical data (previous purchases, abandoned carts, etc.) to gain insights on the likelihood that a user still has the intent to procure the items in their order. If such intent is deemed lacking, this will trigger same-day delivery in the hopes of saving the sale, by removing barriers to receiving their goods.

Figure 1:
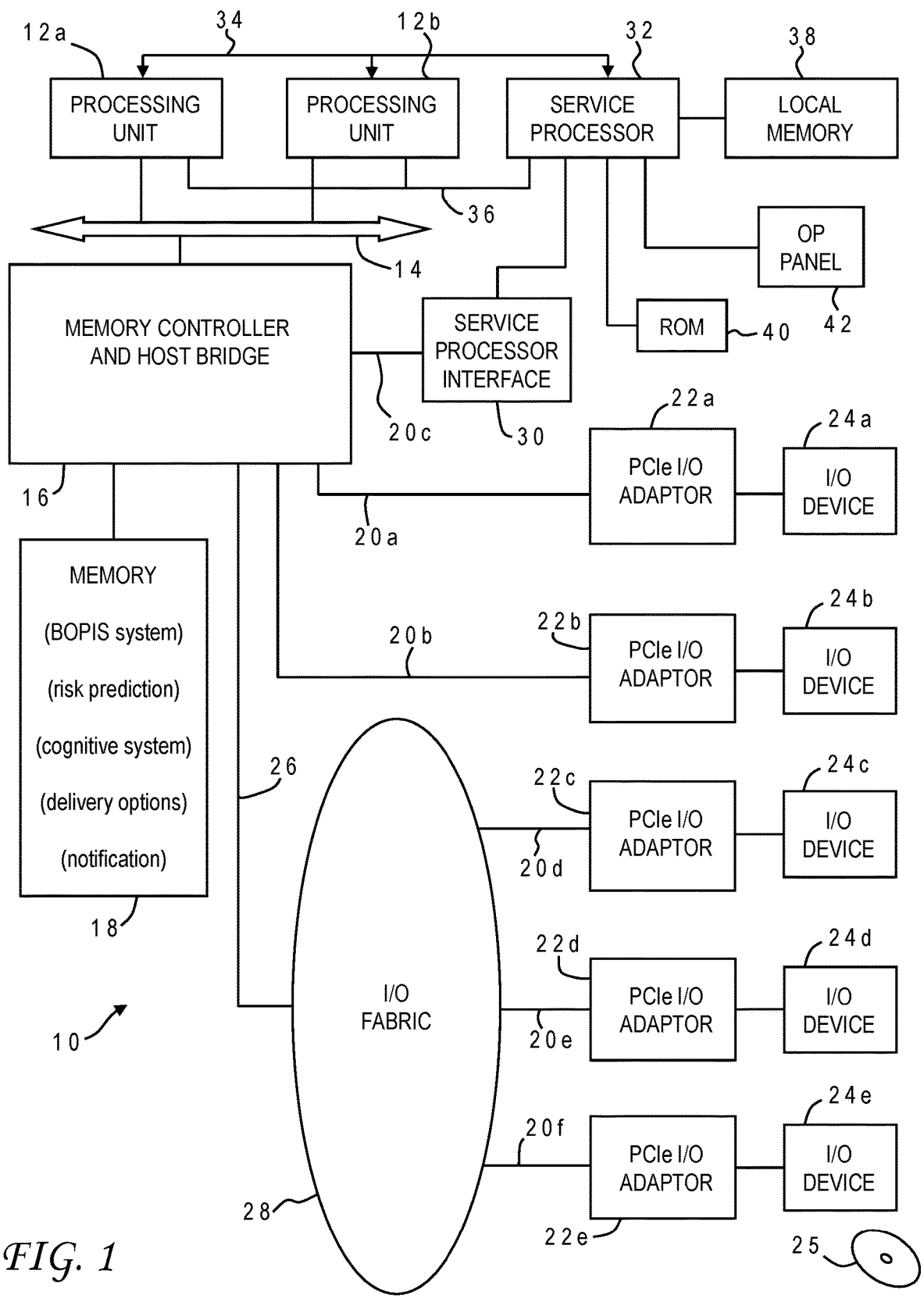
FIG. 1 is a block diagram of a computer system programmed to carry out buy-online pickup-in-store (BOPIS) order management and saving of near-abandoned orders in accordance with one implementation of the present invention.

With reference now to the figures, and in particular with reference to FIG. 1, there is depicted one embodiment 10 of a computer system in which the present invention may be implemented to carry out BOPIS order management and save a BOPIS order from abandonment by converting it to same-day delivery. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention, including a BOPIS ordering system, risk prediction regarding abandonment of the BOPIS order, a cognitive system which may be used as part of that prediction, as well as modules for delivery options and notification to the customer.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the BOPIS order handling system of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a BOPIS ordering process that uses novel prediction techniques to detect and respond to imminent abandonment of an order. Accordingly, a program embodying the invention may additionally include conventional aspects of various BOPIS tools, and these details will become apparent to those skilled in the art upon reference to this disclosure.

Figure 2:
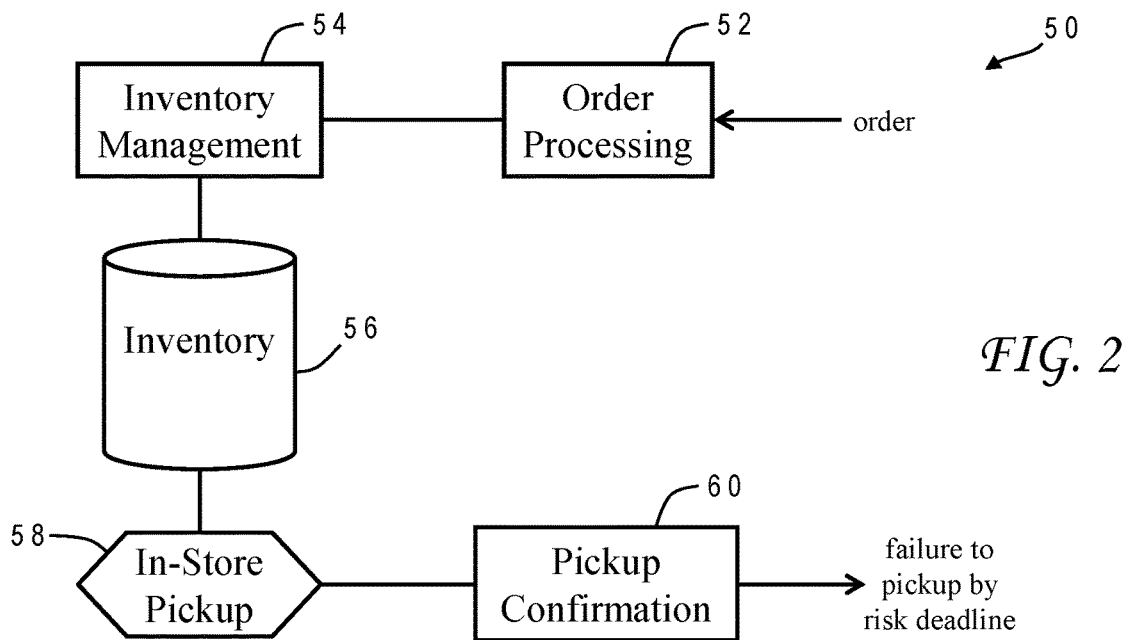
FIG. 2 is a block diagram of a BOPIS order system for a store in accordance with one implementation of the present invention.

Referring now to FIG. 2, there is depicted one embodiment of a BOPIS ordering system 50 for a brick-and-mortar (B&M) store which may be used to carry out various implementations of the present invention. "Brick-and-mortar" as used herein merely denotes that the store is more that a virtual presence on the Internet, i.e., it has a physical presence and can be visited in-person by customers, but is otherwise not limiting. For example, the store could be a traditional retail front or could be a warehouse that is designed only for pickups with no shopping allowed. BOPIS ordering system 50 includes an order processing module 52 which receives orders made online by a customer. The customer may interface with the order system by any convenient means such as a desktop or laptop computer, or a mobile computing device such as a cellphone. Items desired by the online shopper can be placed in a virtual cart and confirmed through a checkout process as conventionally known. Order processing module 52 communicates with an inventory management module 54 which verifies that an ordered product is indeed in the store's inventory 56. The product is then moved its from normal inventory location to an in-store pickup 58. The placement of the product for pickup may be performed manually by a store associate or in an automated fashion using conventional equipment which locates the product in inventory 56, grabs it, and carries it to the front of the store. The in-store pickup can be at a manned kiosk of the store, or a secure locker, or simply held at a storefront counter. When the product is picked up by the customer, a pickup confirmation 60 is generated, again either by a manual entry into the system or by automated detection of the pickup. In this manner BOPIS system 50 is aware of whether or not the product has been picked up at any given time, and can thus provide an indication of a failure to pickup by a risk deadline which is computed as described further below in conjunction with FIGS. 4-6.

Figure 3:
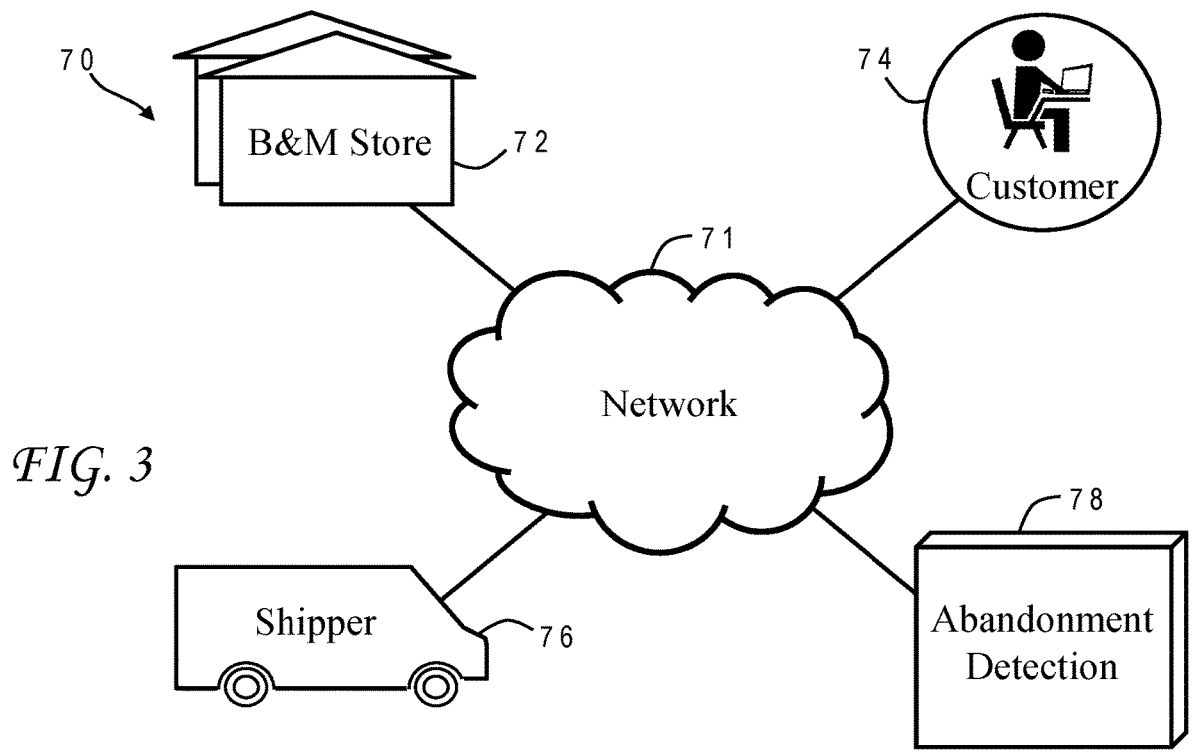
FIG. 3 is a block diagram showing network interaction between a brick-and-mortar store, a customer and a shipper, with an abandonment avoidance module in accordance with one implementation of the present invention.

FIG. 3 shows a network environment 70 for interactions between the brick-and-mortar store 72, a customer 74, a shipper 76, and an abandonment detection module 78 in accordance with one implementation of the present invention. Customer 74 places the order with store 70 over a network 71 such as the Internet. The order can include ancillary data such as identifying information pertaining to the customer and a preferred time for pickup of the product. Store 72 can provide order confirmation to customer 74 via the same network 71. The order confirmation can also reflect the intended pickup time and provide additional information such as a confirmation code to facilitate pickup. Store 72 also provides information pertaining to the BOPIS order to the abandonment detection module 78 which uses this information, as explained further below, to predict a point in time at which the order can be deemed abandoned by the customer. While abandonment detection module 78 is shown as a feature remote from store 72 and communicating via network 71 (e.g., managed by an agent of the store), it could be located at the store itself.

Abandonment detection module 78 can inform store 72 of the point in time at which the order is to be deemed abandoned, and store 72 can monitor the order pickup relative to this risk deadline; alternatively, abandonment detection module 78 can perform this monitoring. If the product is picked up before the risk deadline, the order salvage functions of the present invention are not necessary. However, if the product is not picked up by the risk deadline, store 72 (or abandonment detection module 78) can invoke the save procedure. In this case, store 72 communicates with one or more of the shippers 76 via network 71 to inquire as to the availability of a shipper to pickup the product at store 72 and deliver it to an address for customer 74, as well as the cost for delivery and any time constraints (same-day delivery is preferably requested in order to incentivize the customer's approval, but same-day delivery is not absolutely required). This inquiry can be manually performed by a store associate using the shippers' online presence, or can be automated using appropriate application program interfaces (APIs) with the shippers' systems. If a shipper is available to deliver the product in a timely manner (say, within no more than three days), store 72 can relay the lowest delivery cost to customer 74 (or multiple delivery options for different shippers), and ask customer 74 to confirm that delivery is acceptable according to these terms. This notification can include other information related to the order, as well as requesting any additional information from customer 74 that might be necessary for delivery.

Determination of the risk deadline can be rules-based, but is preferably a combination of rules and an analysis of the BOPIS order (and customer) performed by a cognitive system. Cognitive systems in general are known. A cognitive system (sometimes referred to as deep learning, deep thought, or deep question answering system) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feed-forward neural network based on animal visual perception, and so is particularly useful in processing image data. Convolutional neural networks are similar to ordinary neural networks but are made up of neurons that have learnable weights and biases.

There are many alternatives to the use of neural networks for machine learning, such as a support vector machine (SVM). An SVM basically constructs a multidimensional mathematical space based on training examples, and provides a boundary in that space that allows for binary classification of an input, e.g., as a "good" answer versus a "bad" answer. Another approach involves Bayesian networks which represent a set of variables with a directed acyclic graph. The network is then used to compute probabilistic relationships between the variables. A cognitive system is not limited to use of a single approach, i.e., it can incorporate any number of these machine learning algorithms.

A modern implementation of artificial intelligence is the IBM Watson™ cognitive technology, which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level. In the context of the present invention, a cognitive system can be trained to provide an indication of whether a BOPIS order is likely (yes/no) to have become abandoned as of a certain time, as explained further below in conjunction with FIG. 5.

Figure 4:
FIG. 4 is a sample profile for a customer having historical pickup information which can be used to predict when a BOPIS order is likely to become abandoned in accordance with one implementation of the present invention.

Whether the risk determination is rules-based or based on cognitive analysis, it can rely on historical information pertaining to previous BOPIS orders made by the particular customer, as well as other customer information that might bear on the abandonment risk. In some implementations of the present invention, this historical information is collected over time to build a unique profile for a given customer. FIG. 4 shows one example 80 of such a profile for customer Jen Q. Smith. The profile can include a unique identifier (ID) for each customer, as well as background information such as the customer's physical address and contact information like an email address. The customer's physical address will of course be used in the case where the customer confirms delivery of an outstanding BOPIS order, but could also be used by the cognitive system, e.g., to determine a distance to the particular B&M store and include that in the cognitive analysis (customers very near a store are less likely to abandon an order). Profile 80 additionally contains historical pickup information for this customer. The historical pickup information can vary considerably depending on implementation and designer constraints. In the illustrative implementation, the historical pickup information includes (i) the minimum amount of time passing between this customer placing an order and picking it up, (ii) the maximum amount of time passing between this customer placing an order and picking it up, (iii) the average time it took for this customer to pickup the product, (iv) the number of actual pickups, (v) the number of pickups abandoned, and (vi) an indication (yes/no) of whether this customer is a frequent user of BOPIS ordering, which can be based on predetermined usage criteria (e.g., has this customer made an absolute minimum number of BOPIS orders from this store, or some threshold number of BOPIS orders from this store in the last six months). The time periods may be expressed in any convenient form, e.g., hours and/or days.

Profile 80 may further include other information pertaining to the customer that is unrelated to historical pickup information. For example, profile 80 could include demographic data that might be relevant to whether a BOPIS order is going to be abandoned. As noted above, millennials (a demographic grouped roughly characterized as having birth dates between 1981 and 1996) are apparently more likely to abandon BOPIS orders, so the birth date of the customer could be used to establish this or other demographic groups. In particular for the cognitive system implementation, machine learning allows the cognitive system to pick up on such correlations even when they may not be readily intuitive to human observers.

Figure 5:
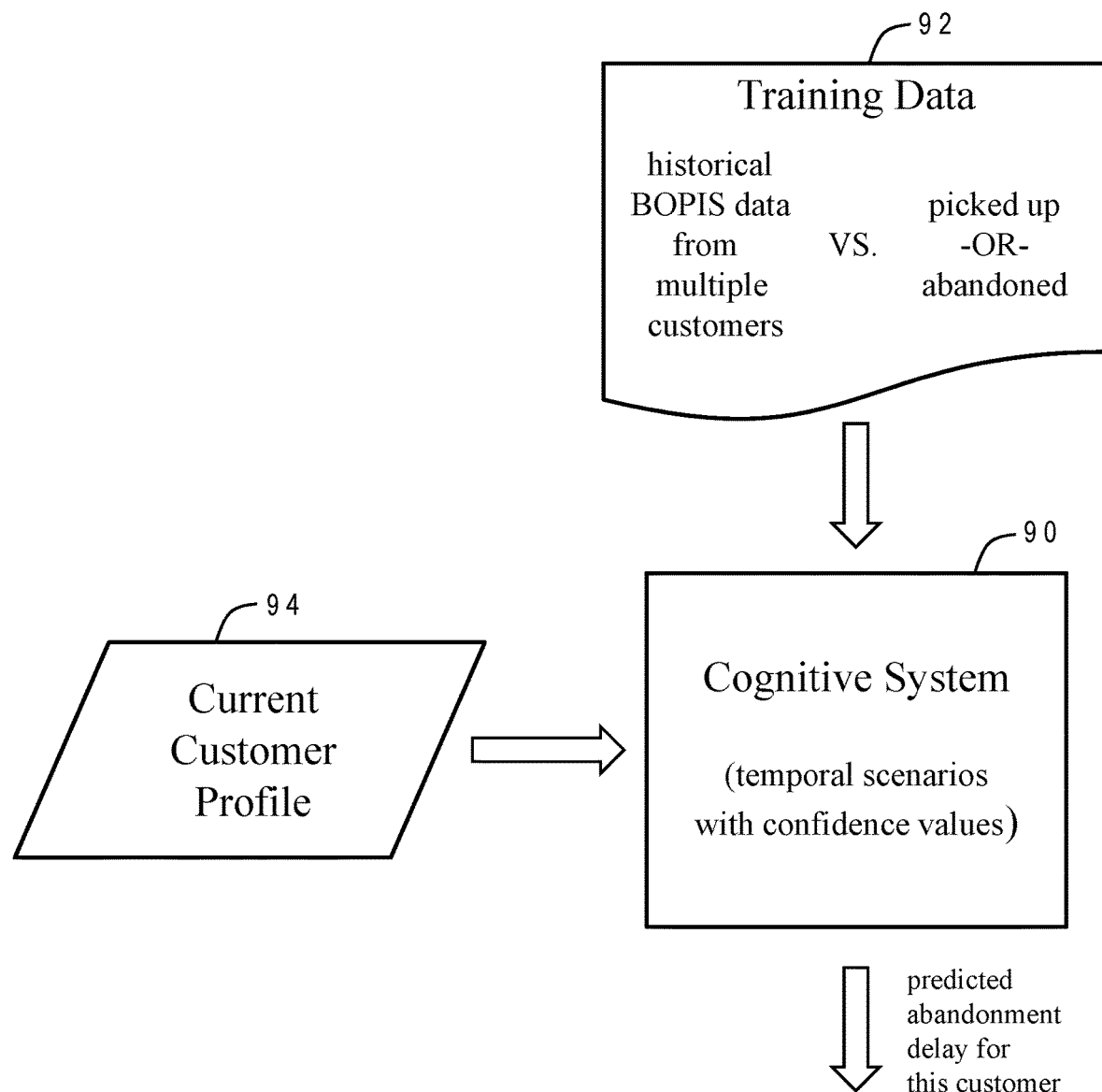
FIG. 5 is a block diagram of a cognitive system used to predict a likely abandonment delay for the BOPIS system of FIG. 2 in accordance with one implementation of the present invention.

FIG. 5 shows how a cognitive system 90 may be trained and used to assess possible abandonment of a BOPIS order in accordance with one implementation of the present invention. Cognitive system 90 is prepared using training data 92 from previous BOPIS orders of multiple customers and multiple stores; a given cognitive system might be tailored to a specific store or store-type (e.g. hardware store versus apparel store) using BOPIS data from only that store or store-type. Training data 92 includes a large number of input pairs, one for each BOPIS order, the input pair comprising the given BOPIS order data and the associated outcome (0/1) for that order, i.e., whether the order was actually picked up or was abandoned. The BOPIS order data can include the information previously alluded to as part of the customer profile such as historical pickup information for a given customer, background information for the given customer, and demographic information for the given customer.

Once so trained, cognitive system 90 is able to discern the likelihood that a given order will become abandoned as of a certain point in time through binary classification (abandoned versus not abandoned). In the illustrative implementation, this likelihood is based on a confidence level generated by cognitive system 90 indicating that an order will be abandoned at a given time. For example, a confidence value of 100% indicates definite abandonment while a confidence value of 0% indicates no likelihood of abandonment. The exact value of the confidence level needed to support a finding of likely abandonment is a matter of designer preference; an exemplary threshold is 66%. Cognitive system 90 can run different temporal scenarios for the current BOPIS order using the current customer profile 94 as an input, with different possible pickup times according to a search routine which narrows down the time at which the confidence level crosses the preset threshold. This time point is then used as the predicted point of abandonment, i.e., any delay in picking up the product beyond this point is deemed to result in abandonment. The abandonment delay is preferably expressed as a number of hours (relative to the order confirmation by the B&M store or other time associated with the order), but could use finer or coarser granularity. This delay is then added to the order time to arrive at the risk deadline. For example, if the order was confirmed at 3:00 pm on Monday and the predicted abandonment delay is computed as 68 hours, then the risk deadline for this order would be 11:00 am the following Thursday. If the package is not picked up by that time, the BOPIS system will invoke the same-day delivery option to save the sale.

While FIG. 5 only shows current customer profile data being used for the cognitive analysis, in some implementations the analysis also relies on other information pertaining to the current order, e.g., store information (type, location, volume), calendar information (day of the week, time of the month, the season, or holidays), the price paid for the order, etc. These same parameters would be part of the historical training data as well. This application of rescuing a BOPIS order is a great use case for a machine learning system that can take these different data points and leverage past order data to make the best possible determination of an abandonment threshold per-order. This approach is seen as much more accurate long-term compared to a naive rules engine.

Figure 6:
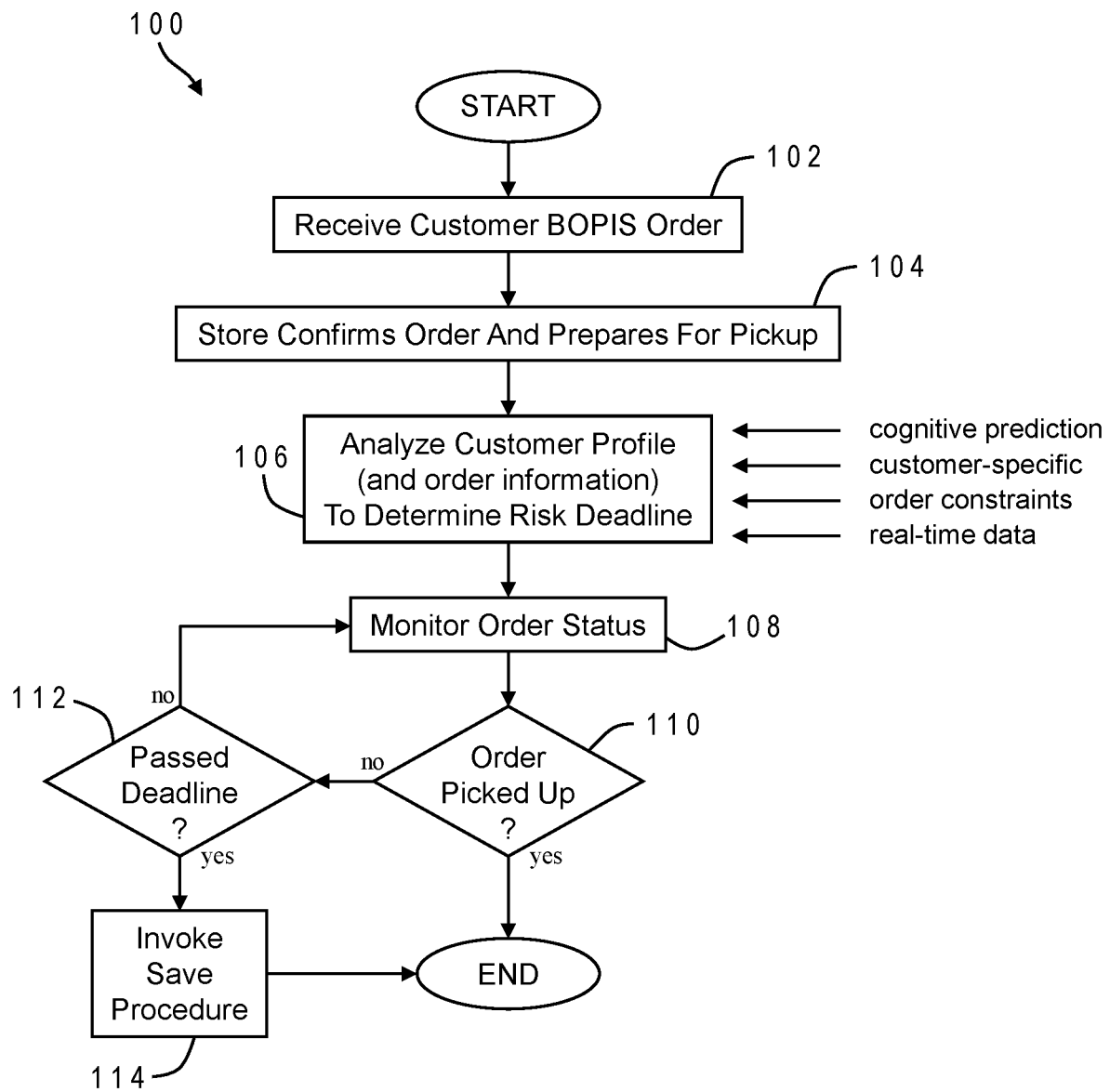
FIG. 6 is a chart illustrating the logical flow for a monitoring process used to determine when a BOPIS order is about to become abandoned in accordance with one implementation of the present invention.

The present invention may be further understood by reference to FIG. 6 which is a chart illustrating the logical flow for a BOPIS order monitoring process 100 in accordance with one implementation of the present invention. Process 100, which can be carried out using computer system 10, begins when the BOPIS system receives the order from the customer (102). The customer can place a BOPIS order on an eCommerce website just like they would today. The order is tied to a particular brick-and-mortar store physically close to the customer. The order includes customer information (such as a customer ID) and order information pertaining to the product and pickup time. The store confirms the order by sending a return communication via the contact information for this customer, and prepares the product for physical pickup (104). The BOPIS system retrieves the customer profile associated with this customer ID and leverages it (possibly along with other order information) to determine a risk deadline (106), i.e., a point in time at which the sale can possibly be lost. As previously noted, computation of the risk deadline can be totally rules-based, totally cognitive-based, or some combination of cognitive analysis and rules. Each rule may realistically contribute more or less to the end decision in different scenarios, at different times, and at different retailers. For example, a retailer that sells holiday gifts may experience shorter order pickup time-frames during the holiday season due to high demand, whereas an auto parts shop may not experience any noticeable spikes or dips in that regard. Some rules may be a customer-specific time frame, such as the delay exceeding the longest time span between when previous orders have been placed to when the customer has picked them up. Other rules can be order-based such as a maximum time until an order is automatically canceled, that is, approaching the cutoff when the eCommerce website will cancel the order and (if applicable) refund the customer due to no BOPIS pickup. Other dynamic business rules can be set by the eCommerce retailer, such as items with low long-term customer interest being preferred for inventory release as soon as possible. The deadline analysis can also use real-time data such as site activity patterns, store traffic, etc.

Returning to FIG. 6, once the risk deadline is computed, the BOPIS system constantly monitors the order status (108). If the order is picked up (110), the sale is complete and the process ends. Otherwise, a periodic check is made to see if the deadline has passed (112). If the deadline has not passed, the process repeats iteratively at box 108. The risk deadline can be updated while the pickup is pending. If the deadline has passed during any iteration, the procedure to save the sale by same-day delivery is invoked (114).

Figure 7:
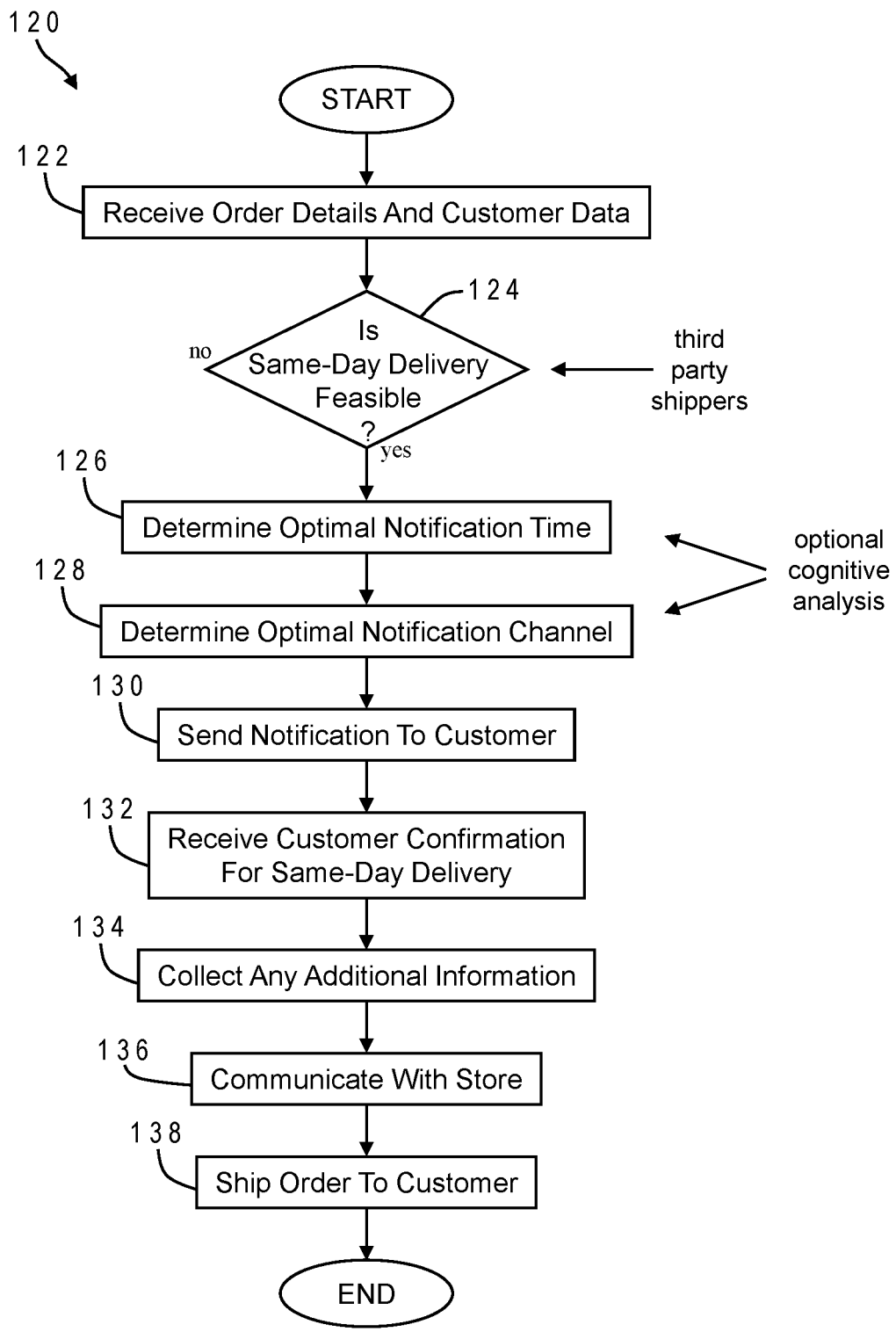
FIG. 7 is a chart illustrating the logical flow for a save procedure invoked when a BOPIS order has been determined to be at risk of abandonment, to convert the order to a delivery in accordance with one implementation of the present invention.

FIG. 7 is a chart illustrating the logical flow for such a save procedure 120 in accordance with one implementation of the present invention. Procedure 120, which may also be carried out using computer system 10, begins by receiving the order details and customer data (122). The BOPIS system determines whether same-day delivery (or other short-term delivery) is feasible (124), i.e., by checking availability of various third-party shippers (or the store's own shipping department) using the store address as a pickup location and the customer address as a drop-off location. This inquiry can include a price check. If same-day delivery is not available, the procedure exits and the BOPIS system will just wait until the final cancellation deadline in case the customer still picks up the item. If same-day delivery is available, the system can determine an optimal time(s) to notify the customer about the possibility of same-day delivery for their placed order (126). The optimality metric can be based on several factors with the end goal of getting the customer to opt-in for same-day delivery (with a concession of reminding the customer that they need to pick up their order from the store) to ultimately save the sale. Optimality may be based on the ideal time for the customer or timed with the store, or some combination thereof. An ideal time for the customer might be derived from the engagement rate of previous notifications sent to the customer (particularly with respect to engagement drop- offs after a certain amount of time has passed once orders were placed). For example, one customer might typically interact with notifications sent within 24 hours of their order, as opposed to a customer who typically ignores notifications sent after 24 hours. Timing with the store might involve time constraints related to the brick-and-mortar store associated with the order such as a fulfillment time, i.e., how long it takes for the item(s) to be ready for pickup from when they are ordered online. There may be a slow order time where there are certain hours of the day where BOPIS orders are more popular. For example, if the majority of orders are placed between 2 and 3 pm on Thursdays, the system can avoid any customer notifications that could add to that busy time frame. The notification timing might also depend on store hours, i.e., when the store will be open. It may not be optimal to send the customer a notification if there is a high probability that the customer will view the notification for the first time while the store is closed. In this case, the most optimal choice would be a deferred delivery for the next time the store is open. In addition to these timing rules, a separate cognitive system could be used for optimal time notification.

The system also preferably determines an optimal notification channel(s) for offering same-day delivery to the customer (128). This selection is based on the notification channels available to the retailer to contact the customer. In the event of a plurality of channels available, optimality factors can take into account the engagement rates from the foregoing step but with respect to notification channels instead of time. For example, a customer might typically interact with links included in emails, or a customer usually does not respond to automated text messages. Non-exhaustive examples of applicable notification channels include email, texts (short messaging service, or SMS), a push notification to a computing device of the customer, or even regular ("snail") mail such as a postcard. Likewise, the determination of an optimal notification time and channel may also benefit from a separate cognitive analysis. The system then notifies the customer at the identified optimal time(s) and through the identified optimal channel(s) of the possibility to get their BOPIS order delivered same-day (130). The notification can include instructions for opting-in for same-day delivery as well as an estimate of the cost for same-day delivery based on the store's address and the delivery address if it is known to the retailer. The retailer can optionally set preferences on how to discount the same-day delivery. For example, if the customer shops at the store consistently and is considered a loyal customer, their shipping may be reduced or free. If the order is particularly high value (e.g., over $100), the order may again be shipped free to save the sale. The customer's current BOPIS abandonment rate can also be considered—if the customer has never abandoned a BOPIS order they may have simply forgotten they placed the order. Therefore they will be rewarded to continue to place BOPIS orders if they receive a discount on delivery. Alternatively, the notification may include an option to extend the BOPIS pickup to alert the store that the customer is still coming so the order is not canceled and items returned to the shelves.

Save procedure 120 continues with the customer confirming the opt-in for same-day delivery (132). The system can collect any additional information from the customer necessary for scheduling the delivery (134). This step may or may not be necessary depending on the granularity of customer information known to the retailer (e.g., a retailer may not collect customer mailing addresses for BOPIS orders). In one embodiment, this inquiry could be a form contained within the retailer's website that a customer would need to fill information into. In another embodiment, this information could be collected through the same notification channel identified above if the channel facilitates bidirectional communication, e.g., the customer text messages a programmatically monitored number and then the system parses and extracts key information from the customer's message. Non-exhaustive examples of key information include the customer's physical address, special instructions for drop-off, the customer's phone number in the event of delivery problems, and the customer's preferred delivery time, if any. The system communicates with the store associates, confirming that the item is still picked and packed, and not out on the floor (136). Store associates can confirm using a keyboard, mouse, mobile device, or otherwise. If the store associate does not confirm, an error message is sent back to the customer and the process is abandoned. Once the store confirms, the system schedules a same-day delivery for the items (138), and can optionally send a further notification to the customer with the name of the courier company and delivery time. The store can use any delivery service such as Gofleetly (internet URL: www.go-fleetly.com) which uses eCommerce delivery software and APIs to access a network of couriers via a single-integration point for same-day delivery, and the item(s) are delivered to the customer's address.

FIG. 8 is a sample notification 150 that is sent to a customer whose BOPIS order has been selected for abandonment recovery via same-day shipping in accordance with one implementation of the present invention. According to this example, customer Jen has placed an order online (BOPIS) at her local department store for pick-up that same day, but she forgets to go and pick it up, and pretty soon two days have gone by. The department store typically sends a reminder email and then if the customer still does not show after 48 hours more the order would be cancelled. Using the present invention, the system instead sends notification 150 as an electronic document such as an email. The email goes out to Jen to remind her to pickup her BOPIS order, it also includes an option to have the order delivered to her home, as well as extending the BOPIS pickup time or just canceling the order. In this case the delivery charge is only seven dollars. Jen knows that she is not going to be able to make it to the department store before the order is automatically canceled and really wants to get the item today, so she chooses to have it delivered by activating the button object 152 embedded in notification 150 using a graphical pointer (mouse), touch-screen or other user interface.

The present invention thereby provides a superior way to save a BOPIS order that would otherwise be lost. As more and more brick-and-mortar stores are being pressured to meet customer expectations to deliver goods same day, more retailers will be looking for the best solutions to organize in-store pickup of orders. This invention additionally provides a valuable tool for retail clients looking to get into the same-day delivery space without any changes to an eCommerce purchasing flow. The system can be integrated outside of the typical checkout flow for a post-purchase experience. This solution could also be integrated into existing order fulfillment offerings.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the preference is to provide same-day delivery in order to save the sale, the present invention can still be implemented for other than same-day delivery. It is therefore contemplated that such modifications can be made without departing from the spirit or scope of the present invention as defined in the appended claims.

What is claimed is:

1. A method of assessing a likelihood of abandonment of a current buy-online pickup-in-store (BOPIS) order for a product of a store by a customer comprising:
    training a cognitive system having a neural network using a computer system with historical information on previous BOPIS orders from multiple customers, the computer system receiving the historical information of the BOPIS orders from a BOPIS ordering computer system, the historical information including BOPIS data for a given one of the previous BOPIS orders respectively correlated with a historical outcome relative to a pick-up or abandonment of the given order;
    receiving, at the computer system, a current customer profile uniquely associated with the customer, the current customer profile including historical data pertaining to multiple previous BOPIS orders from only the customer, the current customer profile being generated by the BOPIS ordering computer system;
    analyzing, using the cognitive system, the historical data using natural language processing by using models for scoring and ranking results for training based on sets of inputs and outputs, wherein the sets include input questions and output answers and the models are used to determine a confidence level of an answer of the output answers wherein the output answer includes a likelihood of a current BOPIS order becoming abandoned with respect to a time;
    using the cognitive system to predict an abandonment delay for the current BOPIS order based on the current customer profile, the abandonment delay representing a period of time after which the BOPIS order is likely to become abandoned;
    determining, using the cognitive system, that delivery of the product after a threshold deadline from a location of the store to an address of the customer is still feasible for a known delivery charge;
    transmitting, using the cognitive system, a notification to the customer that the product can be delivered with proposed delivery details including the delivery charge;
    receiving, using the cognitive system, a confirmation for delivery from the customer responsive to the notification;
    collecting, using the cognitive system, additional information from the customer for scheduling a delivery;
    communicating, using the cognitive system, with a store associate for confirming the product is picked and packed; and
    scheduling, using the cognitive system, a delivery for the product.

2. The method of claim 1 wherein the current customer profile further includes demographic data associated with the customer which is used by the cognitive system in predicting the abandonment delay.

3. The method of claim 1 wherein the cognitive system generates a confidence value indicating whether the BOPIS order will be abandoned by a given point in time, and abandonment of the BOPIS order is deemed likely when the confidence value exceeds a predetermined threshold.

4. The method of claim 1 further comprising computing a risk deadline for the current BOPIS order based on the abandonment delay relative to an order time associated with the current BOPIS order.

5. The method of claim 4 wherein computation of the risk deadline is further based on a customer-specific time frame, one or more order constraints, and real-time data.

6. The method of claim 4 further comprising:
monitoring a pickup status of the current BOPIS order to determine that the product has not been picked up by the risk deadline.

7. A computer system comprising:
one or more processors which process program instructions;
a memory device connected to said one or more processors; and
program instructions residing in said memory device for assessing a likelihood of abandonment of a current buy-online pickup-in-store (BOPIS) order for a product of a store by a customer, the program instructions being executable by a computer to cause the computer to:
receive a current customer profile uniquely associated with the customer wherein the current customer profile includes historical data pertaining to multiple previous BOPIS orders from only the customer, and using a cognitive system to predict an abandonment delay for the current BOPIS order based on the current customer profile, the abandonment delay representing a period of time after which the BOPIS order is likely to become abandoned, wherein the cognitive system is trained with historical information on previous BOPIS orders from multiple customers, the computer system receiving the historical information of the BOPIS orders from a BOPIS ordering computer system, the historical information including BOPIS data for a given one of the previous BOPIS orders respectively correlated with a historical outcome relative to a pick-up or abandonment of the given order, analyzing natural language using natural language processing, the current customer profile being generated by the BOPIS ordering computer system;
analyze, using the cognitive system, the historical data using natural language processing by generating models for scoring and ranking results for training based on sets of inputs and outputs, wherein the sets include input questions and output answers and the models are used to determine a confidence level of an answer of the output answers wherein the output answer includes a likelihood of a current BOPIS order becoming abandoned with respect to a time; and
determine that delivery of the product after a threshold deadline from a location of the store to an address of the customer is still feasible for a known delivery charge, transmitting a notification to the customer that the product can be delivered with proposed delivery details including the delivery charge, receiving a confirmation for delivery from the customer responsive to the notification, collecting additional information from the customer for scheduling a delivery, communicating with a store associate for confirming the product is picked and packed, and scheduling a delivery for the product.

8. The computer system of claim 7 wherein the current customer profile further includes demographic data associated with the customer which is used by the cognitive system in predicting the abandonment delay.

9. The computer system of claim 7 wherein the cognitive system generates a confidence value indicating whether the BOPIS order will be abandoned by a given point in time, and abandonment of the BOPIS order is deemed likely when the confidence value exceeds a predetermined threshold.

10. The computer system of claim 7 wherein said program instructions further compute a risk deadline for the current BOPIS order based on the abandonment delay relative to an order time associated with the current BOPIS order.

11. The computer system of claim 10 wherein computation of the risk deadline is further based on a customer-specific time frame, one or more order constraints, and real-time data.

12. The computer system of claim 10 wherein said program instructions further monitor a pickup status of the current BOPIS order to determine that the product has not been picked up by the risk deadline.

13. A computer program product comprising:
a computer readable storage medium; and
program instructions residing in said storage medium for assessing a likelihood of abandonment of a current buy-online pickup-in-store (BOPIS) order for a product of a store by a customer, the program instructions being executable by a computer to cause the computer to:
receive a current customer profile uniquely associated with the customer wherein the current customer profile includes historical data pertaining to multiple previous BOPIS orders from only the customer, the current customer profile being generated by the BOPIS ordering computer system, and use a cognitive system to predict an abandonment delay for the current BOPIS order based on the current customer profile, the abandonment delay representing a period of time after which the BOPIS order is likely to become abandoned, wherein the cognitive system is trained with historical information on previous BOPIS orders from multiple customers, the computer system receiving the historical information of the BOPIS orders from a BOPIS ordering computer system, the historical information including BOPIS data for a given one of the previous BOPIS orders respectively correlated with a historical outcome relative to a pick-up or abandonment of the given order;
analyze, using the cognitive system, the historical data using natural language processing by generating models for scoring and ranking results for training based on sets of inputs and outputs, wherein the sets include input questions and output answers and the models are used to determine a confidence level of an answer of the output answers wherein the output answer includes a likelihood of a current BOPIS order becoming abandoned with respect to a time; and
determine that delivery of the product after a threshold deadline from a location of the store to an address of the customer is still feasible for a known delivery charge, transmitting a notification to the customer that the product can be delivered with proposed delivery details including the delivery charge, receiving a confirmation for delivery from the customer responsive to the notification, collecting additional information from the customer for scheduling a delivery, communicating with a store associate for confirming the product is picked and packed, and scheduling a delivery for the product.

14. The computer program product of claim 13 wherein the current customer profile further includes demographic data associated with the customer which is used by the cognitive system in predicting the abandonment delay.

15. The computer program product of claim 13 wherein the cognitive system generates a confidence value indicating whether the BOPIS order will be abandoned by a given point in time, and abandonment of the BOPIS order is deemed likely when the confidence value exceeds a predetermined threshold.

16. The computer program product of claim 13 wherein said program instructions further compute a risk deadline for the current BOPIS order based on the abandonment delay relative to an order time associated with the current BOPIS order.

17. The computer program product of claim 16 wherein computation of the risk deadline is further based on a customer-specific time frame, one or more order constraints, and real-time data.

18. The computer program product of claim 16 wherein said program instructions further monitor a pickup status of the current BOPIS order to determine that the product has not been picked up by the risk deadline.

\* \* \* \* \*